March 31, 1964 H. LINDE 3,127,008
REFUSE COLLECTING CONTAINER WITH A FEED SCREW
Filed April 24, 1961
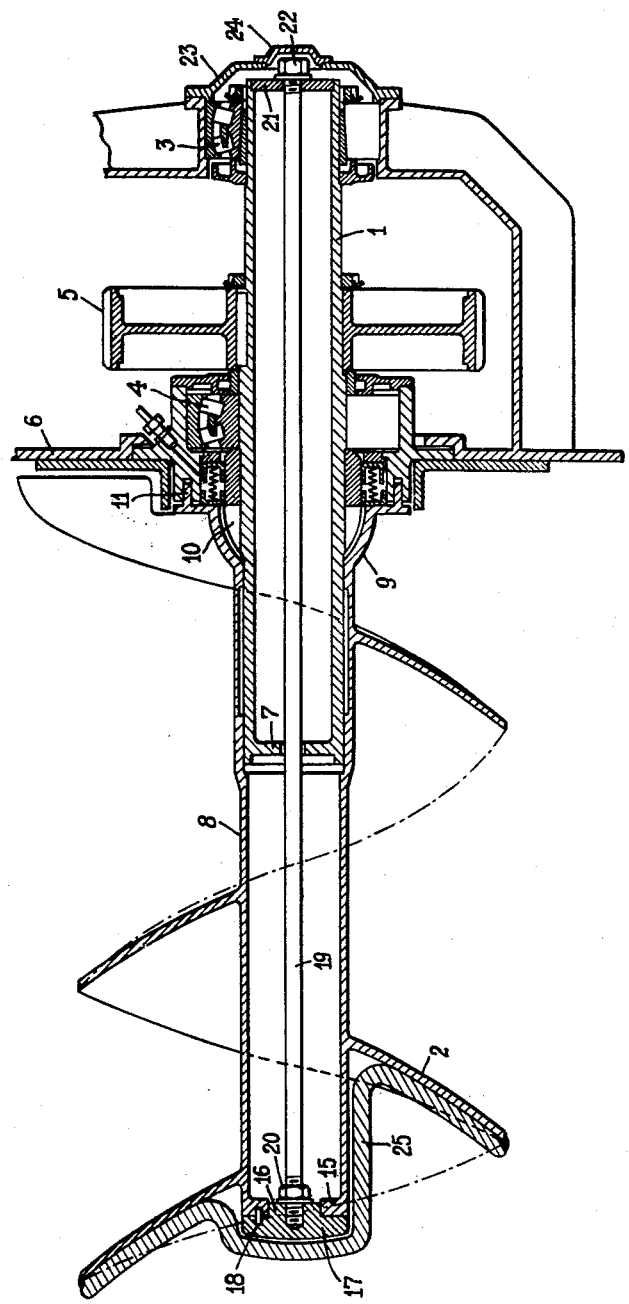
Inventor
Hilding Linde
by Sommers & Young
Attorneys 3,127,008
REFUSE COLLECTING CONTAINER WITH
A FEED SCREW
Hilding Linde, Kalmar, Sweden, assignor to Maskinfabriks Aktiebolaget Norrbacken, Blomstermala, Sweden
Filed Apr. 24, 1961, Ser. No. 105,038
1 Claim. (Cl. 198—213)

The invention relates to refuse collecting containers of the type provided on a motor vehicle and having a feed screw passing through the wall of a collecting container.

By means of such a feed screw the refuse fed into the collecting container may be compressed to a considerably reduced volume, whereby the load space may be better utilized. The screw, however, is thereby subjected to a considerable wear and is, therefore, often to be replaced. The parts of the feed screw especially subjected to wear consist of the fore ends of the spindle and its screw flights.

The principal object of the invention is to reduce this wear as far as possible and to make the feed screw in such a way that the screw proper, i.e. the spindle with the flights, may be easily replaced when necessary.

With this and other objects in view the feed screw of the refuse collecting container according to the invention in composed of a separate driving shaft and a screw with a tubular spindle detachably mounted on said driving shaft within said collecting container.

Further objects and advantages of the invention will become more fully apparent from the following description and the accompanying drawing illustrating one preferred embodiment of the invention, and in which the single figure is a longitudinal section of a feed screw according to one form of the invention.

Referring to the drawing a tubular driving shaft 1 for the screw comprising a tubular spindle 8, and a screw flight 2 is freely supported at its rear end into roller bearings 3, 4, between which the gear box (not shown) is provided for driving the shaft 1 by means of a gear wheel 5. The gear box may be secured to the wall 6 of the refuse collecting container, and the shaft extends the relative short distance through said wall and is at its fore end provided with a transverse end wall 7.

The tubular spindle 8 of the screw has only the rear portion provided around the shaft 1 and forms an enlargement 9 provided on its inside with claws intermeshing similar claws 10 on the driving shaft so as to form a claw coupling.

The rear portion of the enlargement 9 forms a labyrinth seal, and further sealing means may also be provided if desired.

The spindle 8 has its fore end provided with an inner flange 15, and a cover 17 for the spindle 8 with the same diameter as the spindle has a central portion 16 introduced into said flange 15. If this cover is subjected to wear against the compressed refuse, it is made of a more wear resistant material than the screw proper, such as glass-hard manganese steel. For locking the cover against rotation with respect to the spindle 8 it is provided with a pin 18 engaging a corresponding hole in the flange 15. The fore end of a clamping bolt 19 is threaded into a bore extending only partly through the cover 17 and is locked by means of a nut 20. If the cover 17 is not protected against wear it has thus a continuous outer surface and it has also a sufficient thickness to allow a considerable wear before the bolt 19 and the pin 18 are exposed. The clamp bolt passes freely through the wall 7 and continues through a threaded hole in the plate 21 provided in a turned recess in the rear end of the driving shaft, and by means of a nut 22 the clamping bolt may be pressed against the plate. The rear bearing 3 is closed by means of a cap 23 with a removable cover 24 and after removal of this cover the nut 22 is made accessible.

For protection of the screw flights the fore end thereof may be lined with a protecting layer of a wear resistant material, such as manganese steel, which at points along the periphery of the flight may be secured by welding in such a way that it may be easily replaced. This protecting cover may preferably extend less than 360°, such as about 300°, and may have the same form as the flight with the inner diameter substantially the same as the outer diameter of the spindle 8.

On the drawing, however, an embodiment is shown, where the protecting layer 25 encloses the fore end of the spindle 8 and the cover 17, which cover in this case may be made of a less wear resistant material.

While the invention has been particularly shown and described with reference to one preferred embodiment thereof, it will be understood by those skilled in the art that various changes in form and details may be made therein without departing from the spirit and scope of the invention.

What I claim is:

A rotary conveyor screw for forcing refuse into a collecting container, comprising a wall constituting part of said container, a driving means; a hollow driving shaft drivingly coupled to said driving means and extending through said wall partly into said refuse collecting container; a tubular spindle arranged coaxially with respect to said driving shaft in said refuse collecting container, the outer end of said tubular spindle encasing the inner end of said driving shaft; a screw blade, spirally encircling the outer circumferential surface of said tubular spindle and rigidly secured thereto, said screw blade having an arcuate contour as seen in a longitudinal section along the axis of said tubular spindle and a concave surface facing the inner end of said tubular spindle; a cap which sealingly and non-rotatably abuts against the inner end of said tubular spindle and is provided with a threaded hole extending less than completely through said cap and opening outwards; a clamping bolt passing through said hollow driving shaft and said tubular spindle, threads upon the inner end of said clamping bolt in engagement with the threads of said sealing cap; fastening means associated with the outer ends of said hollow driving shaft and said clamping bolt for pressing said tubular spindle onto said driving shaft and for detachably interconnecting them; and a protecting cover of a material more wear-resistant than that of said tubular spindle and said sealing cap having a convex inner end surface and, covering both said cap and at least the inner portion of said screw blade.

References Cited in the file of this patent

UNITED STATES PATENTS

| | | |
|---|---|---|
| 2,223,690 | Linde | Dec. 3, 1940 |
| 2,946,089 | Heston | July 26, 1960 |

FOREIGN PATENTS

| | | |
|---|---|---|
| 690,072 | Great Britain | Apr. 8, 1953 |